United States Patent [19]
Eskritt et al.

[11] 3,955,009

[45] May 4, 1976

[54] DRY DESSERT MIX COMPOSITION AND PROCESS

[75] Inventors: James D. Eskritt; Raymond H. MacDonald, both of Port Hope; Robert R. Sirett, Cobourg, all of Canada

[73] Assignee: General Foods, Limited, Toronto, Canada

[22] Filed: May 2, 1974

[21] Appl. No.: 466,585

[52] U.S. Cl. ................................ 426/578; 426/583
[51] Int. Cl.² .................... A23L 1/187; A23C 9/10
[58] Field of Search ............ 426/167, 168, 350, 583

[56] References Cited
UNITED STATES PATENTS

| | | | |
|---|---|---|---|
| 3,031,308 | 4/1962 | Campbell | 426/167 |
| 3,231,391 | 1/1966 | Breivik | 426/167 |
| 3,434,848 | 3/1969 | Katz | 426/167 |
| 3,471,301 | 10/1969 | Mitchell et al. | 426/168 |
| 3,721,571 | 3/1973 | Glicksman | 426/167 |

FOREIGN PATENTS OR APPLICATIONS 1,072,768   6/1967   United Kingdom................ 426/168

*Primary Examiner*—Jeanette M. Hunter
*Attorney, Agent, or Firm*—Bruno P. Struzzi; Thomas V. Sullivan; Mitchell D. Bittman

[57] ABSTRACT

A dry dessert mix composition for use in preparing a tangy or yoghurt-like dessert by reconstitution of the mix with milk and comprising a pregelatinized starch, an edible acid and a hydrocolloid gum.

5 Claims, No Drawings

DRY DESSERT MIX COMPOSITION AND PROCESS

This invention relates to a dry dessert mix. More particularly, it is concerned with an acidified dry dessert mix which can be stored as a powder and quickly and simply reconstituted by admixture with milk. Still more particularly, this invention is directed to an acidified dry dessert mix which, when combined with milk, is ready to serve in five minutes as a tangy instant pudding or yoghurt-like product.

In recent years, instant pudding mixes which rely on the use of thickeners and milk coagulating agents and coagulating accelerators and thereby eliminate the need for cooking by the housewife have become widely available and accepted. These pudding mixes, however, are usually limited to the non-sour type flavors such as chocolate, vanilla, etc.

Further, although liquid yoghurt analogs and yoghurt-like products may be made with direct acidification, this manufacture involves rather complex liquid phase processing and results in a perishable product similar to commercial yoghurt. Dry mix products, on the other hand, require either low levels of acid or acidogens like glucono-δ-lactone. A major problem with making a yoghurt-like product by direct addition of acid to milk is the fact that the larger quantities of acid required to give a yoghurt tartness results in the precipitation of the milk protein (curds and whey).

It appears that due to curdling of milk when its pH is lowered below the isoelectric point of milk protein, the prior art restricts the use of an acidulent in a milk-based dessert, particularly when a dry mix is to be employed.

The present invention is thus directed to an acidified dry dessert mix which can be reconstituted quickly and simply with cold milk without coagulation and curdling of the milk proteins to produce a tangy or yoghurt-like dessert which will not deteriorate on standing for relatively long periods of time after preparation.

It has been found that a dessert mix of the desirable characteristics set forth immediately above can be provided by employing a unique combination of a pregelatinized and/or modified starch, an edible acid, and a hydrocolloid gum. Such a dessert can be prepared by the consumer or housewife in about 5 minutes.

The combination of ingredients affords increased stability to the finished dessert and enables cold milk to be added to a dessert mix having an acid ingredient without coagulation and curdling of the milk proteins. Although the acidity of the dessert when prepared is reduced below the isoelectric point of the milk, the desired taste and textural properties of tangy and yoghurt-like desserts may be achieved.

The use of a modified and/or pregelatinized starch permits rapid rehydration and quick setting thus preventing coagulation and curdling of the milk proteins.

The addition of a hydrocolloid gum such as guar gum to the mix improves setting characteristics.

This invention thus allows the incorporation of an acidulent in milk-based desserts without coagulation of the milk protein and allows the formulation of fruit-flavored puddings which are normally sour as well as products which simulate the flavor and texture of yoghurt.

The acidified dry dessert mix of the present invention generally comprises 5 to 20% by weight of a modified and/or pregelatinized starch, 1 to 7% by weight of an edible acid and 0.1 to 2% by weight of a hydrocolloid gum. Sugar, 50 to 80% by weight, is also an ingredient in the mix for providing sweetness and bulk.

The dessert mix may also contain flavors in amounts up to about 5% by weight to provide a flavor simulative of tangy fruits or yoghurt.

The mix may also contain emulsifiers in amounts up to about 3% by weight and food colors as desired.

Preferably, the dessert is prepared by reconstituting the dry mix with cold milk and chilling it, if desired, for about 5 to 10 minutes.

A number of modified and/or pregelatinized starches will function in the dessert mix system. The preferred starches are Staley's "Nu-Col" family of starches, which includes modified pregelatinized tapioca starches. However, Staley's "Redisol 88", a pregelatinized tapioca starch, and National's "Ko-Set", a modified pregelatinized tapioca starch may also be used. The type of starch used will affect the texture of the prepared dessert and it has been found that tapioca starches which are pregelatinized and modified either prior to or subsequent to pregelatinization appear to be most satisfactory in their rapid rehydration, quick setting and generally bland flavor characteristics.

Among the edible acids which may be employed are citric, tartaric, malic, lactic, fumaric, adipic and ascorbic acids. Citric acid is usually the preferred acid with fruit-flavored dessert mixes while lactic acid is preferred with those mixes adapted to provide yoghurt-like products. While the dessert mix may be made up at a pH ranging between 3 and 5, the preferred pH is approximately 4. Accordingly, the amount of acid added will be sufficient to bring about a pH of approximately 4 when the mix is reconstituted with milk.

A hydrocolloid gum is added to aid in increasing the viscosity when the mix is first reconstituted with milk and to provide body and texture to the finished dessert. preferably, guar gum is employed.

Sucrose is the preferred sugar to be used as a sweetener although other sugars such as dextrose, corn syrup solids, lactose, etc. may, of course, be used. Such sugars may be employed singly or in combination. Moreover, artificial sweeteners such as, for example, edible saccharin salts, dipeptide salts and the like may be included in the dry mix to replace all or part of the sugar.

An emulsifier may be incorporated in the dry mix dessert although its use is not essential. Typical emulsifiers include mono- and di-glycerides, propylene glycol esters of fatty acids, and lecithin, but other food grade emulsifiers are also suitable.

A preferred emulsifier is Beatrice Foods' "Beatreme E(V)" which is a mixture of mono- and di-glycerides. The emulsifier appears to aid in rehydration and also to reduce foaming when the mix is reconstituted with milk.

The acidified dry dessert mix usually contains fruit flavors, natural or artificial, which, in combination with the acid ingredient, provide tangy finished desserts simulating citrus, berry and other fruit flavors. The mix may, however, include flavors, such as, for example, sour cream, which are adapted to produce yoghurt-like flavors in the finished dessert.

The dessert mix may be packaged in pouches, envelopes and other protective cartons which afford moisture barrier features.

A dessert is prepared from the dry mix by reconstituting approximately 3½ ounces of the mix with two cups of cold milk. Hand whisks, egg beaters, electric mixers or similar means may be used to combine the mix and milk and to disperse the mix thoroughly. Usually, about two minutes mixing time is required. Thereafter, the dessert may be refrigerated for a period of about 5 to 10 minutes prior to serving.

The following examples are given to further illustrate the present invention. The scope of the invention is, however, not meant to be limited to the specific details of the examples.

EXAMPLE I

|  | % by Weight | gm./pkg. |
|---|---|---|
| Sucrose | 78.52 | 77.90 |
| Pregelatinized Starch (Redisol 88) | 15.12 | 15.00 |
| Citric Acid — anhydrous | 4.03 | 4.00 |
| Emulsifier (Beatreme E(V) | 0.92 | 0.91 |
| Guar Gum | 0.50 | 0.50 |
| Flavor (Raspberry) | 0.40 | 0.40 |
| Flavor Enhancer | 0.30 | 0.30 |
| Flavor (Imitation Sour Cream) | 0.18 | 0.18 |
| Color | 0.03 | 0.03 |
|  | 100.00 | 99.22 |

The dessert mix (99.22 grams) is reconstituted with cold milk (2 cups). After it is mixed for two minutes with an electric mixer, the prepared dessert is chilled for ten minutes. A tangy dessert is obtained having good textural and flavor characteristics. Coagulation of the milk, graininess in the dessert, and syneresis upon standing and storage of the dessert are not apparent.

EXAMPLE II

|  | % by Weight | gm./pkg. |
|---|---|---|
| Sucrose | 83.33 | 82.70 |
| Pregelatinized Starch (Nu-Col) | 10.08 | 10.00 |
| Citric Acid | 4.03 | 4.00 |
| Emulsifier (Beatreme E(V) | 1.81 | 1.80 |
| Guar Gum | 0.50 | 0.50 |
| Flavor (Peach) | 0.22 | 0.20 |
| Color | 0.03 | 0.03 |
|  | 100.00 | 99.23 |

The dessert mix (99.23 grams) is reconstituted with cold milk (2 cups). After it is mixed for two minutes with an electric mixer, the prepared dessert is chilled for ten minutes. A tangy dessert is obtained having good textural and flavor characteristics. Coagulation of the milk, graininess in the dessert, and syneresis upon standing and storage of the dessert are not apparent.

The embodiments of the invention in which an exclusive property or privilege is claimed are defined as follows:

1. A dry dessert mix composition for use in preparing a yoghurt-like dessert by reconstitution with milk comprising a pregelatinized starch, an edible acid present in an amount sufficient to bring the pH of the milk-reconstituted mix to 3 to 5, and a hydrocolloid gum.

2. The composition of claim 1 in which said pregelatinized starch is a modified tapioca starch and is present in an amount of from about 5 to 20% by weight.

3. The composition of claim 2 in which said hydrocolloid gum is guar gum and is present in an amount of from 0.1 to 2% by weight.

4. The composition of claim 3 further comprising sugar, flavor, and an emulsifier.

5. A process for preparing a dessert which comprises reconstituting the dessert mix composition of claim 1 with milk.

* * * * *